United States Patent

[11] 3,597,715

[72] Inventor Dhu Aine J. Davis
    Wheaton, Ill.
[21] Appl. No. 817,445
[22] Filed Apr. 18, 1969
[45] Patented Aug. 3, 1971
[73] Assignee Hermetic Coil Co., Inc.

[54] FIXTURE FOR ELECTRICAL SENSING APPARATUS
10 Claims, 7 Drawing Figs.
[52] U.S. Cl............................................. 336/96,
    336/110, 336/192, 335/278
[51] Int. Cl........................................... H01f 27/02
[50] Field of Search.............................. 336/110,
    96, 198, 136, 192; 335/278; 324/34

[56] References Cited
UNITED STATES PATENTS
2,781,496  2/1957  Lathouwers............ 336/110
3,336,552  8/1967  Davis..................... 336/96
3,355,687  11/1967 Adams.................... 336/136

FOREIGN PATENTS
943,334  12/1963  Great Britain.............. 324/34

Primary Examiner—G. Harris
Attorney—Hofgren, Wegner, Allen, Stellman & McCord

ABSTRACT: A unitary fixture for an electrical sensing apparatus which includes a coil, a core and a magnet for creating a magnetic flux to sense the presence of an object of conductive material. The fixture includes a bobbin portion having a coil receiving central portion which encases the core and holds the core axially within the coil. A housing portion is formed integral with the bobbin portion at one end thereof and encases the magnet and holds the magnet coaxially with the coil at one end of the bobbin portion. The bobbin portion has an end wall at the inner end thereof with openings through which end wires from the coil extend for connection to appropriate terminal leads. The housing portion has grooves for receiving and positioning the terminal leads for connection with the end wires and a portion of the housing is made of plastic whereby the end wires and terminal leads are affixed thereto by heat sealing as the end wires are soldered to the terminal leads.

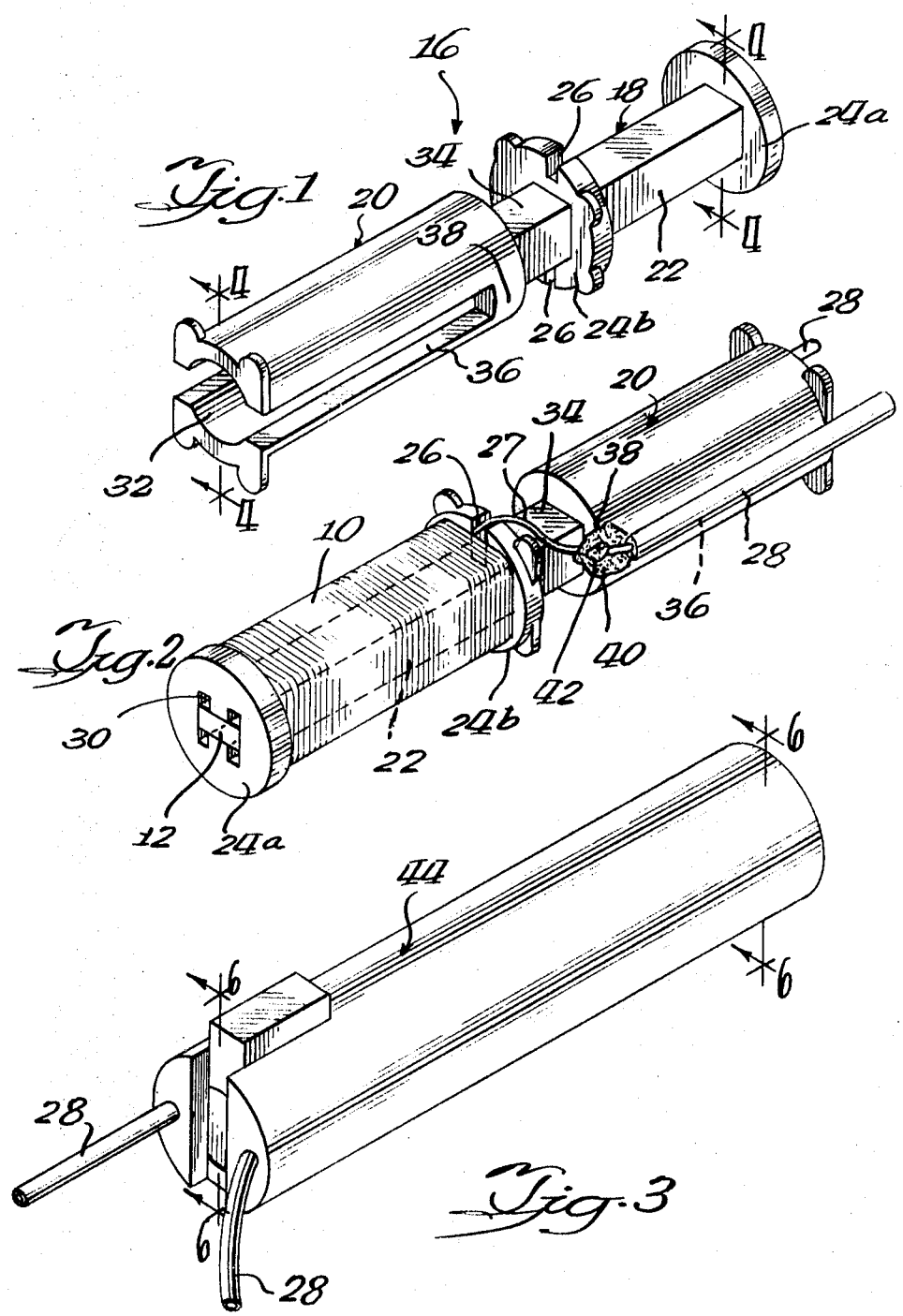

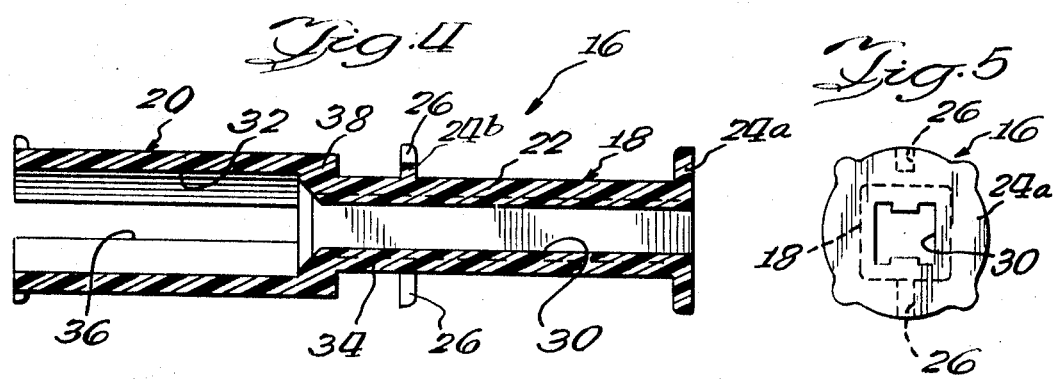
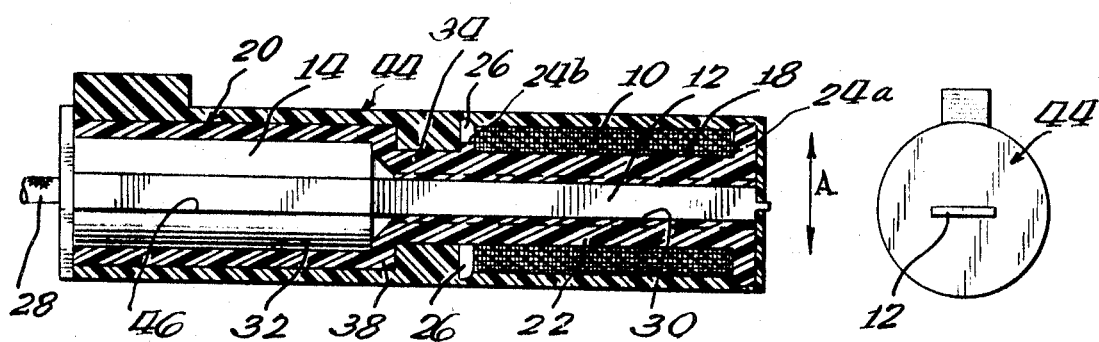

3,597,715

FIXTURE FOR ELECTRICAL SENSING APPARATUS

SUMMARY OF THE INVENTION

This invention relates to a sensing apparatus and particularly to an electrical apparatus for sensing the presence of an object of a conductive material. More particularly, the invention relates to a unitary fixture for an electrical sensing apparatus for mounting and positioning coil, core and magnet members of the apparatus.

The principal object of this invention, therefore, is to provide a new and improved electrical sensing apparatus which has an improved, unitary fixture for mounting the coil, core and magnet of the apparatus. Another object of the invention is to provide a unitary fixture for an electrical sensing apparatus of the character described, the fixture being elongated and having a bobbin portion at one end and a housing portion at the other end. The bobbin portion includes a coil-receiving central portion and a pair of generally parallel end discs at either end of the central portion defining a coil-receiving channel within which is wound a coil. The coil has end wires extending through openings in the one end disc closest to the center of the fixture for connection to appropriate terminal leads. The coil-receiving central portion of the bobbin encases the core in an axial disposition within the coil. The magnet of the apparatus is elongated and the housing portion has a central cavity for receiving and positioning the magnet coaxially of the coil and core. The housing has grooves or recesses on the exterior thereof for receiving the terminal leads and positioning the terminal leads for connection to the coil end wires.

Another feature of the invention set forth in the preceding paragraph is that at least a portion of the housing portion is fabricated of plastic whereby the end wires and terminal leads are affixed thereto by heat sealing as the end wires are soldered to the terminal leads.

A further feature of the invention is the provision of an encapsulating casing for the sensing apparatus and wherein the housing portion has cross-sectional dimensions substantially coextensive with the end discs of the bobbin portion of the fixture whereby the thickness of the encapsulating casing is substantially uniform along the elongated fixture. The grooves on the housing portion of the fixture are formed by elongated recesses on the exterior of the housing portion overlying the encased magnet and the encapsulating casing holds the terminal leads in the grooves. The terminal leads extend through the encapsulating casing and are rigidly held thereby.

Other objects, features and advantages of the invention will become apparent from the following specification and from the accompanying drawings.

DESCRIPTION OF THE DRAWINGS

FIG. 1 is a perspective view of the unitary fixture of this invention for use in an electrical sensing apparatus;

FIG. 2 is a perspective view looking at the opposite end of the fixture shown in FIG. 1, with the components of the sensing apparatus mounted on the fixture before encapsulation;

FIG. 3 is a perspective view of the electrical sensing apparatus embodying the unitary fixture of this invention, fully assembled and encapsulated;

FIG. 4 is a longitudinal central sectional view taken generally in the direction of lines 4—4 in FIG. 1;

FIG. 5 is an elevational view looking at the right-hand end of the fixture shown in FIG. 4;

FIG. 6 is a longitudinal central sectional view taken generally in the direction of lines 6—6 in FIG. 3; and FIG. 7 is an elevational view looking at the right-hand end of the apparatus shown in FIG. 6.

DETAILED DESCRIPTION OF THE INVENTION

Referring to the drawings in greater detail FIGS. 3, 6 and 7 show a fully assembled and encapsulated electrical sensing apparatus embodying the unitary fixture of this invention. Referring to FIGS. 2 and 6, the electrical sensing apparatus generally includes a coil 10, a core 12 mounted axially within the coil and a magnet 14 coaxially with the coil at one end of the core. The coil, core and magnet create a magnetic flux to sense the presence of an object of conductive material which normally is passed by one end of the apparatus generally in the direction of arrow A (FIG. 6). The sensing apparatus shown in the drawings has wide utility, particularly in the computer field.

The unitary fixture of this invention is indicated generally by the numeral 16 in FIGS. 1 and 4. The fixture is elongated and includes a bobbin portion, generally designated 18, at one end thereof and a housing portion, generally designated 20, at the other end. The bobbin portion 18 includes a coil receiving central portion 22 and a pair of generally parallel end discs or walls 24a 24b at either end of the central portion defining a coil receiving channel within which is wound the coil 10 as shown in FIGS. 2 and 6. The end disc 24b which is closest to the center of the fixture has a pair of slots or openings 26 through which winding end wires 27 from the coil 10 extend toward the housing portion 20 for connection to appropriate flexible terminal leads or wires 28, as described in greater detail hereinafter. The coil receiving central portion 22 has an axial bore 30 extending therethrough for receiving and encasing the core 12 in an axial disposition within the coil 10. The housing portion 20 has a central cavity 32 for receiving and positioning the magnet 14 coaxially of the coil 10 and core 12 at the inner end of the bobbin portion 18.

In the preferred form of the invention, the bobbin portion 18 and the housing portion 20 of the elongated fixture 16 are separated by a bridge portion 34 which provides a space to facilitate connecting the winding end wires 27 to the terminal leads 28 as shown in FIG. 2 and as described in greater detail hereinafter.

As shown best in FIGS. 1 and 2, the housing portion 20 has a pair of grooves or recesses 36 for receiving and positioning the terminal leads 28 for connection to the winding end wires 27. The grooves 36 extend longitudinally along the housing portion 20 overlying the magnet 14 and are formed in the exterior wall of the housing portion so that the terminal leads 28 extend away from the sensing apparatus at the end thereof opposite the coil 10 and core 12.

As shown in FIG. 1, the slots 36 for receiving the terminal leads 28 do not extend all the way to the inner end of the housing 20 so as to leave a body portion 38 at the inner end of the housing 20 which is of greater thickness than the remaining walls of the housing portion. In the preferred form of the invention, the entire elongated unitary fixture 16 is molded of plastic material. However, at least the enlarged body portion 38 of the housing portion 20 should be fabricated of plastic material so that the winding end wires 27 and the exposed conductor portions of the terminal leads 28 may be affixed thereto by heat sealing as shown by the flashed portion indicated at 40 in FIG. 2 when the end wires are soldered to the terminal leads as at 42 (FIG. 2).

After the coil 10, core 12, magnet 14 and terminal leads 28 are mounted on the unitary fixture 16 and the winding end wires 27 and terminal leads are heat sealed to the enlarged portion 38 of the housing portion 20 of the fixture as shown in FIG. 2, an encapsulating casing, generally designated 44 in FIGS. 3 and 6, is molded about the sensing apparatus. As shown best in FIG. 4, the cross-sectional dimension of the housing portion 20 of the unitary fixture 16 is substantially coextensive with the end discs 24a 24b so that the thickness of the encapsulating casing 44 as shown in FIG. 6 is substantially uniform along the elongated fixture (except a greater thickness occurs about the bridge portion 34 of the fixture) to avoid any thin or weakened portions in the casing. It can be seen that with the grooves for receiving the terminal leads 28 being formed on the exterior of the housing portion 20 of the fixture, the encapsulating casing 44 holds the terminal leads securely within the grooves. In addition, as seen in FIG. 3, the terminal leads extend through the encapsulating casing 44 and are rigidly held thereby.

As noted in FIGS. 1, 4 and 6, the grooves 36 actually are cut entirely through the wall thickness of the housing portion 20 of the fixture and the magnet 14 has elongated recesses 46 formed on the exterior thereof and into which are seated the terminal leads 28. This arrangement provides for a compact structure whereby the terminal leads 28 do not protrude radially outwardly of the fixture.

It should be pointed out that the core 12 and magnet 14 need not be separate elements but could be formed as a unitary core-magnet structure.

The foregoing detailed description has been given for clearness of understanding only and no unnecessary limitations should be understood therefrom as some modifications will be obvious to those skilled in the art.

I claim:

1. A unitary fixture for an electrical sensing apparatus which includes a coil, a core, and a magnet for creating a magnetic flux to sense the presence of an object of a conductive material, and a pair of elongated flexible terminal leads for connection to end wires from the coil, the unitary fixture being elongated and having a bobbin portion at one end thereof and a housing portion at the other end and formed integral with the bobbin portion, said bobbin portion including a coil-receiving central portion and a pair of generally parallel end discs at either end of the central portion defining a coil-receiving channel within which the coil is wound, the end wires from the coil extending through openings in the one end disc closest to the center of the fixture for connection to the terminal leads, said housing portion having grooves for receiving said terminal leads and positioning the terminal leads for connection to the end wires, said central portion of the bobbin encasing said core in an axial disposition within the coil, said magnet being elongated and said housing portion having a central cavity for receiving and positioning said magnet coaxially of said coil and core.

2. A unitary fixture for an electrical sensing apparatus which includes a coil, a core and a magnet for creating a magnetic flux to sense the presence of an object of a conductive material, a pair of terminal leads for connection to end wires of the coil, the unitary fixture being elongated and having a bobbin portion at one end thereof and a housing portion at the other end and formed integral with the bobbin portion, said bobbin portion including a coil-receiving central portion and a pair of generally parallel end discs at either end of the central portion defining a coil-receiving channel within which the coil is wound, the coil end wires extending through openings in the one end disc closest to the center of the fixture for connection to the terminal leads, said central portion of the bobbin encasing said core in an axial disposition within the coil, said magnet being elongated and said housing portion having a central cavity for receiving and positioning said magnet coaxially of said coil and core, and an elongated encapsulating casing for said sensing apparatus extending lengthwise of said sensing apparatus at least over said bobbin portion and said housing portion and wherein said housing portion has cross-sectional dimensions substantially coextensive with said end discs whereby the thickness of said encapsulating casing is substantially uniform along said elongated fixture to avoid any thin or weakened portions in the casing.

3. A unitary fixture for an electrical sensing apparatus which includes a coil, a core and a magnet for creating a magnetic flux to sense the presence of an object of a conductive material, a pair of terminal leads for connection to end wires from the coil, the unitary fixture being elongated and having a bobbin portion at one end thereof and a housing portion at the other end and formed integral with the bobbin portion, said bobbin portion including a coil-receiving central portion and a pair of generally parallel end discs at either end of the central portion defining a coil-receiving channel within which the coil is wound, the coil having end wires extending through openings in the one end disc closest to the center of the fixture for connection to the terminal leads, said central portion of the bobbin encasing said core in an axial disposition within the coil, said magnet being elongated and said housing portion having a central cavity for receiving and positioning said magnet coaxially of said coil and core, said housing portion having elongated axially extending recesses on the exterior thereof overlying said magnet for receiving said terminal leads and positioning the terminal leads for connection to said end wires, said openings in said one end disc being angularly spaced from said recesses to facilitate connecting the terminal leads to said end wires.

4. The electrical sensing apparatus of claim 1 including an encapsulating casing for said sensing apparatus and wherein said grooves on said housing portion are formed by elongated axially extending recesses on the exterior of the housing portion overlying said magnet, said encapsulating casing holding the terminal leads in the grooves.

5 The electrical sensing apparatus of claim 2 wherein said terminal leads extend through the encapsulating casing and are rigidly held thereby.

6. The electrical sensing apparatus of claim 4 wherein said grooves extend entirely through the thickness of said housing portion, and including elongated axially extending recesses on the exterior of said magnet beneath said grooves for receiving and positioning the terminal leads.

7. The electrical sensing apparatus of claim 3 including a bridge portion between said one end disc and said housing portion, said bridge portion having a smaller cross-sectional dimension than said housing portion to provide a space therebetween for manipulating and connecting the winding end wires to the terminal leads.

8. A unitary fixture for an electrical sensing apparatus which includes a coil and core-magnet structure for creating a magnetic flux to sense the presence of an object of a conductive material, and a pair of terminal leads for connection to end wires from the coil, said fixture comprising: a bobbin portion having a coil-receiving central portion, said central portion encasing a core portion of said core-magnet structure and holding the core portion axially within the coil, and a housing portion formed integral with the bobbin portion and encasing a magnet portion of said core-magnet structure and holding the magnet portion coaxially with the coil at one end of the bobbin, said housing portion having grooves for receiving said terminal leads and positioning the terminal leads for connection to end wires from said coil.

9. The electrical sensing apparatus of claim 8 including an encapsulating casing for said sensing apparatus and wherein said grooves on said housing portion are formed by elongated axially extending recesses on the exterior of the housing portion overlying the magnet portion of said coil-magnet structure, said encapsulating casing holding the flexible terminal leads in the grooves.

10. The electrical sensing apparatus of claim 9 wherein said grooves extend entirely through the thickness of said housing portion, and including elongated axially extending recesses on the exterior of said magnet portion beneath said grooves for receiving and positioning the terminal leads.